(12) United States Patent
Tillotson

(10) Patent No.: US 9,031,311 B2
(45) Date of Patent: May 12, 2015

(54) IDENTIFICATION OF AIRCRAFT SURFACE POSITIONS USING CAMERA IMAGES

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 13/781,349

(22) Filed: Feb. 28, 2013

(65) Prior Publication Data

US 2014/0241572 A1  Aug. 28, 2014

(51) Int. Cl.
| G06T 7/00 | (2006.01) |
| B64C 3/00 | (2006.01) |
| B64C 3/10 | (2006.01) |
| G06K 9/00 | (2006.01) |
| B64D 45/00 | (2006.01) |
| B64D 47/08 | (2006.01) |

(52) U.S. Cl.
CPC ........ G06K 9/00624 (2013.01); B64D 45/0005 (2013.01); B64D 47/08 (2013.01); B64D 2045/0085 (2013.01)

(58) Field of Classification Search
CPC ............... G06T 7/0004; G06T 7/0006; G06T 2207/30108; G06T 2207/30164; B64C 3/00; B64C 9/00; B64C 2009/005
USPC .............. 382/141, 152; 73/1.78, 117.01, 147, 73/865.9
See application file for complete search history.

(56) References Cited

U.S. PATENT DOCUMENTS

| 3,757,121 A * | 9/1973 | Poirier ...................... 250/316.1 |
| 4,666,303 A * | 5/1987 | Pryor ............................ 356/606 |
| 5,180,122 A * | 1/1993 | Christian et al. ........... 244/134 F |
| 5,283,643 A * | 2/1994 | Fujimoto ...................... 348/143 |
| 6,264,135 B1 * | 7/2001 | Dacosta ........................ 244/1 R |
| 6,366,311 B1 * | 4/2002 | Monroe ....................... 348/148 |
| 6,405,975 B1 * | 6/2002 | Sankrithi et al. ............. 244/1 R |
| 6,721,640 B2 * | 4/2004 | Glenn et al. ................. 701/33.4 |
| 7,137,162 B2 * | 11/2006 | Spencer et al. ................ 14/71.5 |
| 8,042,765 B1 * | 10/2011 | Nance ........................ 244/100 R |
| 2002/0093564 A1 * | 7/2002 | Israel ............................ 348/145 |
| 2003/0215141 A1 * | 11/2003 | Zakrzewski et al. .......... 382/190 |
| 2006/0136102 A1 * | 6/2006 | Burner et al. ..................... 701/3 |
| 2010/0201972 A1 * | 8/2010 | Marsh et al. ................ 356/152.1 |
| 2010/0214411 A1 * | 8/2010 | Weinmann et al. .......... 348/148 |
| 2011/0013016 A1 | 1/2011 | Tillotson |
| 2012/0224058 A1 * | 9/2012 | Benning et al. ............... 348/144 |

FOREIGN PATENT DOCUMENTS

EP     818387 A1 *  1/1998

OTHER PUBLICATIONS

Del Frate, et al. United States. NASA. In-Flight Flow Visualization Results From the X29-A Aircraft at High Angles of Attack. Edwards, California: , 1992. Print.*

(Continued)

*Primary Examiner* — Michael A Newman
(74) *Attorney, Agent, or Firm* — Yee & Associates, P.C.

(57) ABSTRACT

A method and apparatus for identifying a position of a surface on an aircraft. Image data for an image of the surface on the aircraft is received. The image data is processed to determine whether the position of the surface on the aircraft is a desired position. A surface position identification report comprising information identifying whether the position of the surface on the aircraft is the desired position is generated.

19 Claims, 8 Drawing Sheets

(56) References Cited

OTHER PUBLICATIONS

Flenning, et al. "Deformation measurements of smart aerodynamic surfaces." Optical Diagnostics for Fluids/Heat/Combustion and Photomechanics for Solids. 3783. (1999): 1-11. Print.*

Kirmse, et al. "Development of a Multi Camera System for Flap Gap Observation in Flight Testing." 17th SFTE (EC) Symposium (2006): 1-10. Print.*

Burner, et al. "Videogrammetric Model Deformation Measurement Technique." Journal of Aircraft 38.4 (2001). Print.*

Tillotson, "Strike Detection Using Video Images," U.S. Appl. No. 13/584,559, filed Aug. 13, 2012, 54 pages.

Latecoere, "Landscape Camera System," http://www.seb-studio.fr/_projets_/latecoere/spip.php?rubrique12, copyright 2012, accessed Aug. 14, 2012, 1 page.

Securaplane Technologies, Inc., "Camera systems," http://securaplane.com/products/camera-systems, copyright 2012, accessed Aug. 14, 2012, 2 pages.

Esterline CMC Electronics, "See More with SureSight Integrated Sensor Systems for Enhanced Flight Vision System Applications," http://www.esterline.com/Portals/17/Documents/en-us/SureSight_4pager.pdf, Jul. 2012, accessed Aug. 14, 2012, 4 pages.

\* cited by examiner

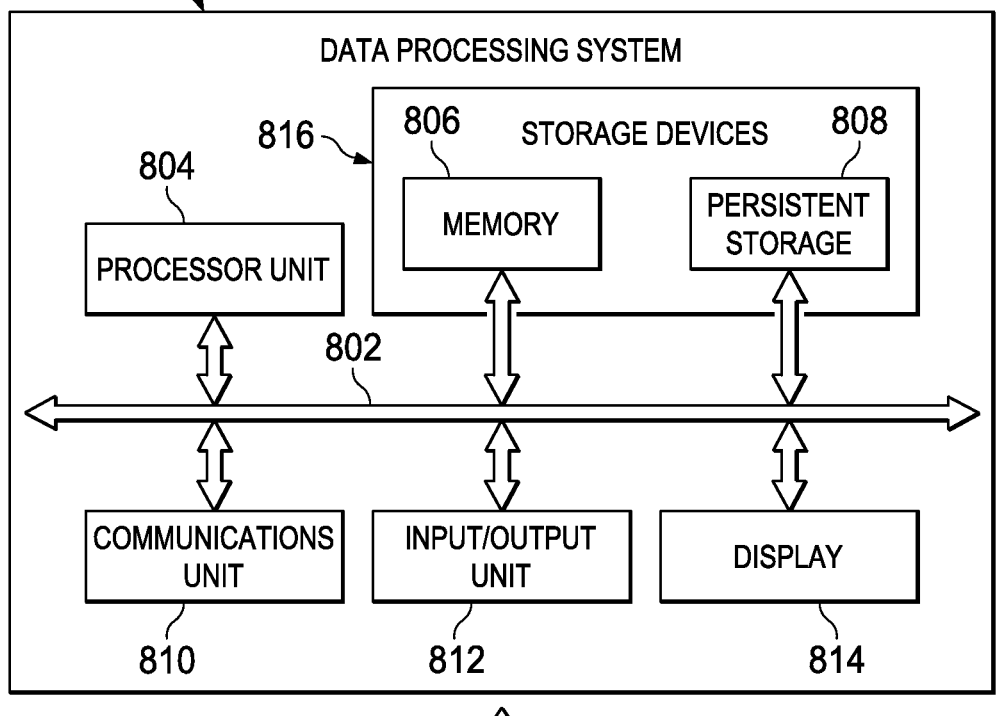
FIG. 8
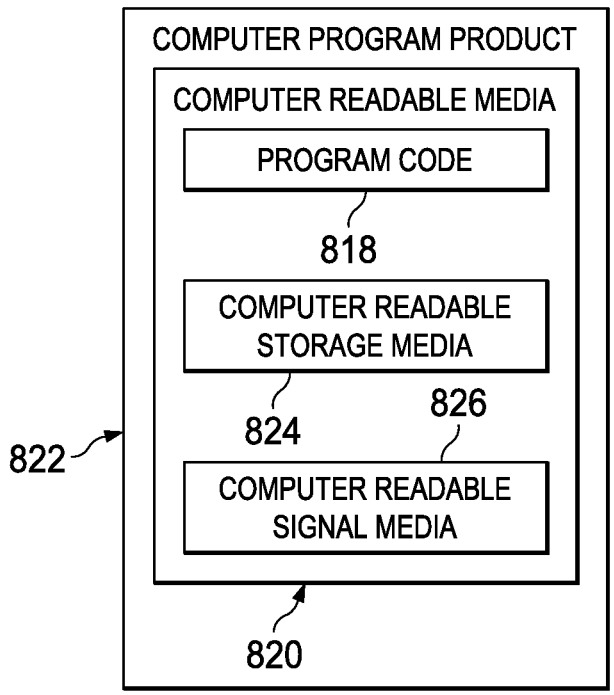

IDENTIFICATION OF AIRCRAFT SURFACE POSITIONS USING CAMERA IMAGES

BACKGROUND INFORMATION

1. Field

The present disclosure relates generally to systems and methods for processing image data to identify the positions of surfaces on an aircraft. More particularly, the present disclosure relates to processing image data from a camera on an aircraft to identify out-of-rig surfaces on the aircraft.

2. Background

As an aircraft ages, parts that were assembled to precise tolerances may begin to lose their tight configurations. Flaps, slats, spoilers, ailerons, and other movable surfaces may slip slightly out of place, even when they are fully retracted. Movable surfaces on an aircraft that have shifted from their desired position on the aircraft may be referred to as being "out-of-rig."

Out-of-rig surfaces on an aircraft may increase drag. Increased drag may result in increased fuel burn resulting, therefore, in increased costs for operating the aircraft.

Out-of-rig surfaces on an aircraft may be identified during routine maintenance inspections of the aircraft. However, the misalignment of out-of-rig surfaces on an aircraft may only be visible during flight.

When surfaces on an aircraft are far enough out-of-rig, the flight crew may notice an anomalous off-center trim setting during flight. Alternatively, or in addition, the flight management computer on an aircraft may detect and log an anomalous off-center trim setting. If such an anomalous off-center trim setting is reported several times, maintenance personnel may check for possible causes of the anomalous off-center trim setting, including checking for out-of-rig surfaces on the aircraft.

When surfaces on an aircraft are far enough out-of-rig, an operator of the aircraft may detect an increase in the amount of fuel burned by the aircraft. For example, an airline or other operator of an aircraft may identify an increased use of fuel by an aircraft. In response, the operator of the aircraft may check for possible causes of the increased fuel usage, including checking for out-of-rig surfaces on the aircraft.

Current methods for identifying out-of-rig surfaces on an aircraft may not identify such surfaces until excess operating costs have been incurred due to increased drag and the resulting increased use of fuel that may be caused by such out-of-rig surfaces. Therefore, a system and method for identifying out-of-rig surfaces on an aircraft in a timely manner may be desirable.

Accordingly, it would be beneficial to have a method and apparatus that takes into account one or more of the issues discussed above as well as possibly other issues.

SUMMARY

An illustrative embodiment of the present disclosure provides a method for identifying a position of a surface on an aircraft. Image data for an image of the surface on the aircraft is received. The image data is processed to determine whether the position of the surface on the aircraft is a desired position. A surface position identification report comprising information identifying whether the position of the surface on the aircraft is a desired position is generated.

Another illustrative embodiment of the present disclosure provides an apparatus comprising an image data receiver, a surface position identifier, and a report generator. The image data receiver is configured to receiving image data for an image of a surface on an aircraft. The surface position identifier is configured to process the image data to determine whether the position of the surface on the aircraft is a desired position. The report generator is configured to generate a surface position identification report comprising information identifying whether the position of the surface on the aircraft is a desired position.

Another illustrative embodiment of the present disclosure provides a method for identifying a position of a surface on an aircraft. Image data for an image of the surface on the aircraft is received. The image data is processed to identify characteristics of a feature in the image corresponding to the position of the surface on the aircraft. Characteristics of an expected feature in the image corresponding to a desired position of the surface are determined. The characteristics of the feature in the image are compared to the characteristics of the expected feature to determine whether the position of the surface on the aircraft is the desired position.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

FIG. 8 is an illustration of a block diagram of a data processing system in accordance with an illustrative embodiment.

DETAILED DESCRIPTION

Figure 1:
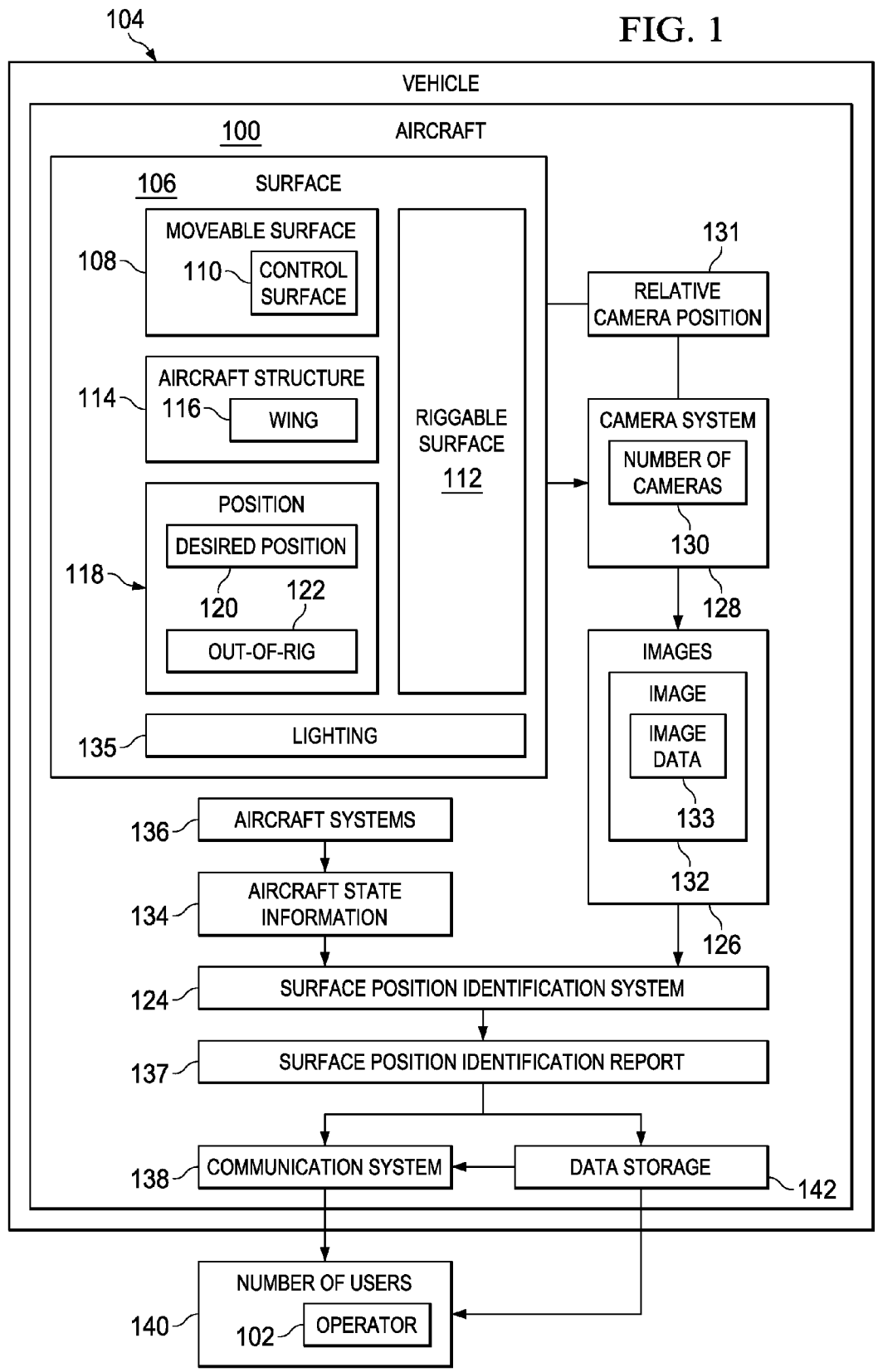
FIG. 1 is an illustration of a block diagram of an aircraft with surface position identification using camera images in accordance with an illustrative embodiment.

The different illustrative embodiments recognize and take into account a number of different considerations. "A number," as used herein with reference to items, means one or more items. For example, "a number of different considerations" means one or more different considerations.

The different illustrative embodiments recognize and take into account that, currently, out-of-rig surfaces on an aircraft are typically identified only after the effects of such out-of-rig surfaces on the performance of the aircraft become noticeable. In this case, drag on the aircraft caused by such out-of-rig surfaces may result in using excess fuel and increased operating costs for some time before the out-of rig surfaces on the aircraft may be identified and corrected. These increased operating costs may be reduced if the out-of-rig surfaces on the aircraft are identified in a timely manner.

The different illustrative embodiments recognize and take into account that mechanical sensors may be used to identify the positions of movable surfaces on an aircraft. Such sensors may be used to identify whether the movable surfaces are out-of-rig. However, many such sensors providing an appropriate level of resolution may be needed to identify out-of-rig surfaces on an aircraft. Such sensors, and the wiring that may be needed for such sensors, may be relatively expensive to install and maintain. Furthermore, such sensors themselves may begin to lose accuracy over time unless they are properly maintained. Therefore, the use of mechanical sensors for identifying out-of-rig surfaces on an aircraft may have undesirable limitations.

The different illustrative embodiments recognize and take into account that the misalignment of out-of-rig surfaces on an aircraft may only be visible during flight. For example, a movable surface on an aircraft may appear to be properly aligned on the ground, but flight loads may push the surface into an incorrect position during flight. Therefore, such out-of-rig surfaces may not be identified by an inspection that is performed when the aircraft is on the ground.

The different illustrative embodiments recognize and take into account that visible gaps may exist between out-of-rig surfaces and other parts of an aircraft. These visible gaps may not exist if the aircraft surfaces were in the proper position and had not moved out-of-rig over time. Such visible gaps between out-of-rig surfaces and other parts of the aircraft may only become apparent when the aircraft is in flight.

In accordance with an illustrative embodiment, images of various surfaces on an aircraft may be obtained during flight of the aircraft. These images may be processed to identify whether such surfaces are out-of-rig. The identity of any identified out-of-rig surfaces may be reported to an operator of the aircraft so that appropriate action may be taken. For example, an out-of-rig surface on an aircraft that is identified during a flight may be reported to an airline or other operator of the aircraft either during the flight or soon after the flight is completed. The airline or other operator of the aircraft then may rework the out-of-rig surface to restore the desired configuration of the surface in a timely manner. Therefore, the excess drag and resulting increased fuel usage and operating costs that may be caused by the out-of-rig surface may be reduced or eliminated in a timely manner.

In accordance with an illustrative embodiment, a camera may be installed on an aircraft facing toward at least one surface of the aircraft. For example, the camera may be installed facing toward a wing or other part of the aircraft that may include a number of movable control surfaces. The camera may be configured to produce a series of images of the various surfaces on the aircraft in the scene in front of the camera. These images may be processed by a data processing system to identify features corresponding to the positions of the various surfaces in the series of images. The image processing may compensate for camera motion, wing bending, wing twist, and other factors to identify accurately the features corresponding to the positions of the surfaces in the images.

The identified features corresponding to the positions of the surfaces in the images may be used to determine whether any of the surfaces are out-of-rig. For example, lighting conditions at the surfaces at the time the images of the surfaces are obtained and the commanded positions of the surfaces may be used to determine expected features in the images for surfaces that are not out-of-rig. The identified features corresponding to the positions of the surfaces in the images may be compared to the expected features to determine whether or not a surface is out-of-rig. If a surface is determined to be out-of-rig, the out-of-rig surface may be identified to an airline or other operator of the aircraft so that appropriate corrective action may be taken in a timely manner.

Turning now to FIG. 1, an illustration of a block diagram of an aircraft with surface position identification using camera images is depicted in accordance with an illustrative embodiment. Aircraft 100 may be any type of aircraft. For example, without limitation, aircraft 100 may be a fixed wing, a rotary wing, or a lighter than air aircraft. Aircraft 100 may be manned or unmanned. For example, without limitation, aircraft 100 may be an unmanned air vehicle. Aircraft 100 may be designed to perform any mission and may be operated by any operator 102 of aircraft 100. For example, without limitation, aircraft 100 may be a commercial passenger aircraft operated by an airline, a cargo aircraft operated by a private or public entity, a military aircraft operated by a military or other government organization, a personal aircraft operated by an individual, or any other type of aircraft operated by any other operator 102.

Aircraft 100 is an example of vehicle 104 in which illustrative embodiments may be implemented. Vehicle 104 may be any moving platform that is configured to travel through or on any medium. For example, without limitation, vehicle 104 may be an aerospace vehicle that is configured to travel through the air and in space, a land vehicle configured to travel over land, a submarine configured to travel under water, or any other vehicle configured to travel through or on any other medium or combinations of media. For example, without limitation, vehicle 104 may be a surface ship configured to travel on the surface of the water.

Aircraft 100 may include surface 106. Surface 106 may include any structure on aircraft 100 that forms any portion of any surface of aircraft 100. For example, surface 106 may be moveable surface 108. Moveable surface 108 may be control surface 110. Control surface 110 may include any moveable surface 108 or other surface for controlling the flight of aircraft 100. For example, without limitation, control surface 110 may be a flap, a slat, a spoiler, an aileron, or another moveable surface 108 on aircraft 100. Surface 106 also may be referred to as riggable surface 112.

Surface 106 may be attached to or may be a part of aircraft structure 114. Aircraft structure 114 may be any structure forming any portion of aircraft 100 that may be configured to support surface 106. For example, without limitation, aircraft structure 114 may include wing 116 or any other appropriate structure or combination of structures on aircraft 100 that may be configured to support surface 106.

Surface 106 may be defined by position 118 of surface 106 on aircraft 100. For example, position 118 may be the location, orientation, or both the location and orientation of surface 106 with respect to aircraft structure 114 to which surface 106 is attached or of which surface 106 is a part. Position 118 also may be referred to as the current or actual position of surface 106.

Position 118 may be desired position 120. For example, desired position 120 may be position 118 of surface 106 immediately after surface 106 has been assembled or reworked to desired tolerances. Surface 106 in desired position 120 may not affect the operation of aircraft 100 in any undesired manner.

Over time, position 118 of surface 106 may move from desired position 120. When position 118 of surface 106 is a position other than desired position 120, position 118 of surface 106 is out-of-rig 122. Surface 106 that is out-of-rig 122 may affect the operation of aircraft 100 in an undesired manner. For example, surface 106 that is out-of-rig 122 may cause undesired drag on aircraft 100 in flight, resulting in increased fuel use and operating cost.

Aircraft 100 may include surface position identification system 124. Surface position identification system 124 may be configured to identify position 118 of surface 106 on aircraft 100. For example, without limitation, surface position identification system 124 may be configured to identify whether surface 106 on aircraft 100 is out-of-rig 122.

Surface position identification system 124 may be implemented in software running on a data processing system, in hardware, or in a combination of software and hardware. For example, without limitation, surface position identification system 124 may be implemented, in whole or in part, on a dedicated data processing system on aircraft 100 or on a data processing system that is used for other purposes on aircraft 100. Some or all of the functionality of surface position identification system 124 may be implemented off board aircraft 100.

Surface position identification system 124 may be configured to identify position 118 of surface 106 on aircraft 100 using images 126 from camera system 128 on aircraft 100. For example, without limitation, images 126 may include a series of images of surface 106 provided by camera system 128 on aircraft 100. Images 126 also may be referred to as camera images.

Camera system 128 may include number of cameras 130. Number of cameras 130 may be mounted in known or knowable locations and orientations on aircraft 100. Number of cameras 130 may be mounted facing generally in the direction of surface 106 to obtain images 126 of surface 106.

Relative camera position 131 refers to the position of number of cameras 130 with respect to surface 106. Relative camera position 131 may change during flight of aircraft 100.

Surface position identification system 124 may be configured to receive images 126 from camera system 128. For example, surface position identification system 124 may be configured to receive image 132 from camera system 128 in the form of image data 133. Surface position identification system 124 may be configured to process images 126 to identify characteristics of features in images 126 to identify position 118 of surface 106.

Surface position identification system 124 may be configured to use information in addition to images 126 to identify position 118 of surface 106 on aircraft 100. For example, without limitation, such additional information may include aircraft state information 134. Aircraft state information 134 may include any information describing a state or condition of aircraft 100, a state or condition in which aircraft 100 is operating, or both. For example, without limitation, aircraft state information 134 may include the current date and time, the current location of aircraft 100, stage of flight of aircraft 100, commanded position information for surface 106, or other appropriate information or combinations of information that may be used by surface position identification system 124 to identify position 118 of surface 106 on aircraft 100. For example, the current date and time and the current location of aircraft 100 may be used by surface position identification system 124 to identify lighting 133 of surface 106 at the time images 126 of surface 106 are obtained by camera system 128.

Aircraft state information 134 may be provided by aircraft systems 136. Surface position identification system 124 may be configured to receive aircraft state information 134 from aircraft systems 136. Aircraft systems 136 may include various systems and devices on aircraft 100 that may be configured to provide aircraft state information 134. For example, without limitation, aircraft systems 136 may include a navigation system for aircraft 100, such as a satellite based positioning system unit, an inertial navigation system unit, or any other system or device on aircraft 100 for providing aircraft state information 134.

Surface position identification system 124 may be configured to generate surface position identification report 137. Surface position identification report 137 may indicate position 118 of surface 106 on aircraft 100 as identified by surface position identification system 124. For example, surface position identification report 137 may indicate whether surface 106 is out-of-rig 122. Surface position identification report 137 may include information indicating an amount by which surface 106 is out-of-rig 122, an effect on operation of aircraft 100 of surface 106 being out-of-rig 122, or both. For example, without limitation, surface position identification report 137 may include information indicating an amount of additional drag, additional fuel usage, additional operating cost, or another effect or combination of effects on operation of aircraft 100 of surface 106 being out-of-rig 122.

Surface position identification report 137 may be used for a variety of purposes. The particular format of surface position identification report 137 and the particular information that may be included in surface position identification report 137 may depend on how surface position identification report 137 is to be used.

Surface position identification report 137 may be provided to communication system 138 on aircraft 100 for transmission of surface position identification report 137 to number of users 140. For example, without limitation, communication system 138 may include a radio or any other appropriate system on aircraft 100 for transmitting surface position identification report 137 from aircraft 100 to a location on the ground or to any other location or any number of locations off board aircraft 100. Communication system 138 may be configured to transmit surface position identification report 137 to number of users 140 while aircraft 100 is on the ground, in flight, or both.

Surface position identification report 137 may be stored in data storage 142. For example, without limitation, data storage 142 may include any appropriate data storage device. Data storage 142 may be located on aircraft 100, at a location that is not on aircraft 100, or both. Surface position identification report 137 may be retrieved from data storage 142 by number of users 140 at any appropriate time. For example, without limitation, surface position identification report 137 may be retrieved from data storage 142 by number of users 140 via communication system 138 or using any other appropriate system or device.

Number of users 140 may include any user of the information provided in surface position identification report 137. For example, without limitation, number of users 140 may include operator 102 of aircraft 100, a member of the flight crew of aircraft 100, maintenance personnel, or any other authorized user of the information provided in surface position identification report 137. For example, number of users 140 may include a maintenance entity. In this case, surface position identification report 137 may be transmitted to or retrieved by the maintenance entity so that surface 106 on aircraft 100 that is out-of-rig 122 may be identified from the information provided in surface position identification report 137 so that surface 106 may be reworked to restore position 118 of surface 106 to desired position 120.

Surface position identification report 137 may be sent to various users or combinations of users that may be different from or in addition to the users of surface position identification report 137 described as examples herein. The information in surface position identification report 137 may be used by number of users 140 for various purposes and in various ways that may be different from or in addition to the uses of surface position identification report 137 described as examples herein.

Figure 2:
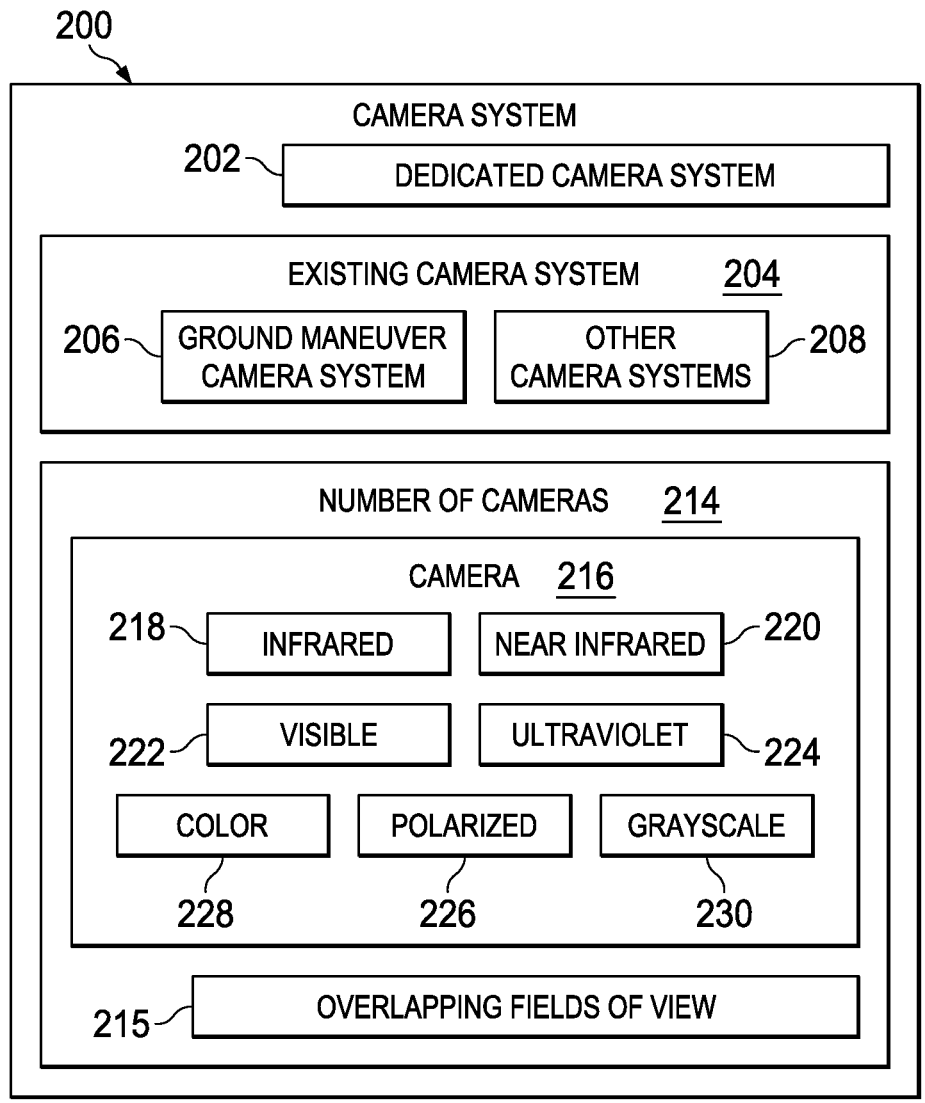
FIG. 2 is an illustration of a block diagram of a camera system in accordance with an illustrative embodiment.

Turning now to FIG. 2, an illustration of a block diagram of a camera system is depicted in accordance with an illustrative embodiment. In this example, camera system 200 is an example of one implementation of camera system 128 in FIG. 1.

Camera system 200 may be dedicated camera system 202 or existing camera system 204. Dedicated camera system 202 may be a camera system that is provided on an aircraft or other vehicle for the purpose of obtaining images for identifying the position of a surface on the aircraft or other vehicle. The images obtained by dedicated camera system 202 may be used exclusively or primarily for identifying the position of a surface on the aircraft. Existing camera system 204 may be a camera system that is provided on an aircraft or other vehicle for obtaining images for a purpose other than identifying the position of a surface on the aircraft or other vehicle. Images obtained by existing camera system 204 may be used both for identifying the position of a surface on the aircraft or other vehicle and for some other purpose. For example, without limitation, existing camera system 204 on a commercial passenger aircraft or other aircraft may include Ground Maneuver Camera System 206, other camera systems 208, or a combination of camera systems.

Ground Maneuver Camera System 206 is a system used on large aircraft to view the nose landing gear and main landing gear of the aircraft during ground operations. This system provides pilots with information on the aircraft position relative to runway and taxiway edges so that the pilot may avoid driving the aircraft off of the pavement.

For example, without limitation, other camera systems 208 may include personal video cameras, video cameras on smart phones, or other appropriate camera systems for obtaining video images.

Camera system 200 may include number of cameras 214. Number of cameras 214 may include cameras of the same type or a number of different types of cameras.

Number of cameras 214 may include multiple cameras with overlapping fields of view 215. Overlapping fields of view 215 may allow for stereoscopic images to be provided by number of cameras 214.

Number of cameras 214 includes camera 216. Camera 216 may operate over any range or ranges of wavelengths to obtain images. For example, without limitation, camera 216 may be configured to obtain images at infrared 218, near infrared 220, visible 222, ultraviolet 224, or other wavelengths or combinations of wavelengths. Camera 216 may be configured to obtain images from light that is polarized 226. For example, without limitation, a polarization filter may be provided on the lens of camera 216. Camera 216 may provide images in color 228 or in grayscale 230.

Figure 3:
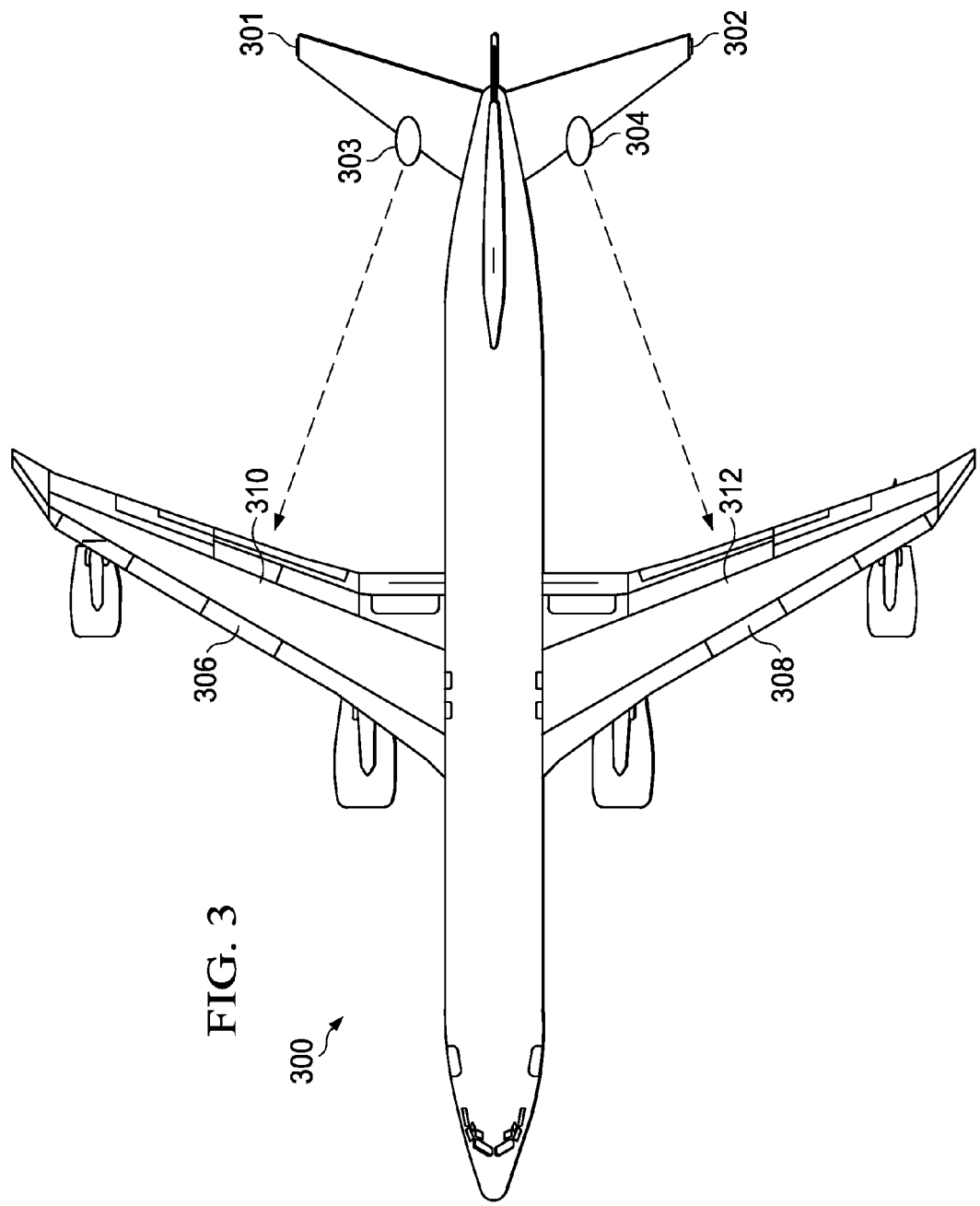
FIG. 3 is an illustration of a top view of an aircraft showing locations of cameras and control surfaces on the aircraft in accordance with an illustrative embodiment.
Figure 4:
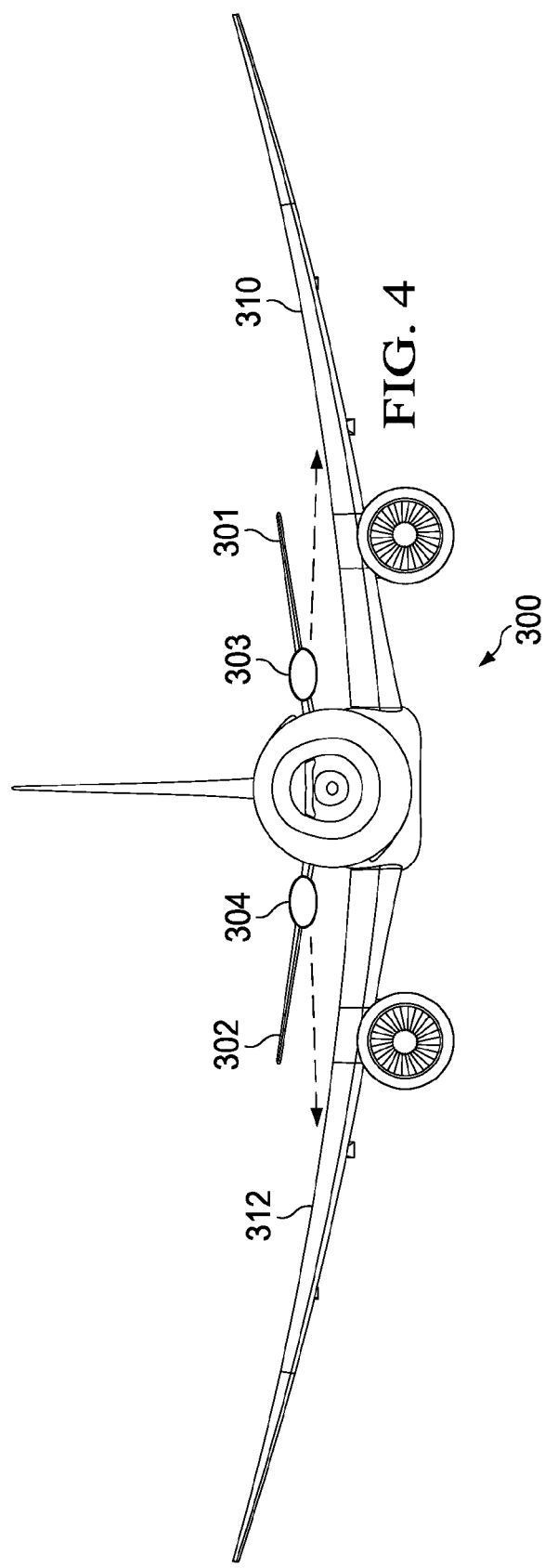
FIG. 4 is an illustration of a front view of the aircraft in FIG. 3.

Turning now to FIG. 3 and FIG. 4. FIG. 3 is an illustration of a top view of an aircraft showing locations of cameras and control surfaces on the aircraft in accordance with an illustrative embodiment. FIG. 4 is an illustration of a front view of the aircraft in FIG. 3. In this example, aircraft 300 is an example of one implementation of aircraft 100 in FIG. 1.

In this example, a camera system that may be used to obtain images for identifying the positions of surfaces on aircraft 300 may include a camera mounted on the leading edge of each horizontal stabilizer 301 and 302 on aircraft 300, at locations 303 and 304, respectively. For example, without limitation, locations 303 and 304 on aircraft 300 may be the locations of cameras that are part of a Ground Maneuver Camera System or other camera system on aircraft 300.

Cameras at locations 303 and 304 on aircraft 300 may be configured to obtain images of control surfaces 306 and 308, respectively, on wings 310 and 312, respectively, of aircraft 300. For example, without limitation, control surfaces 306 and 308 may include spoilers, flaps, or other moveable surfaces or combinations of moveable surfaces on aircraft 300.

Figure 5:
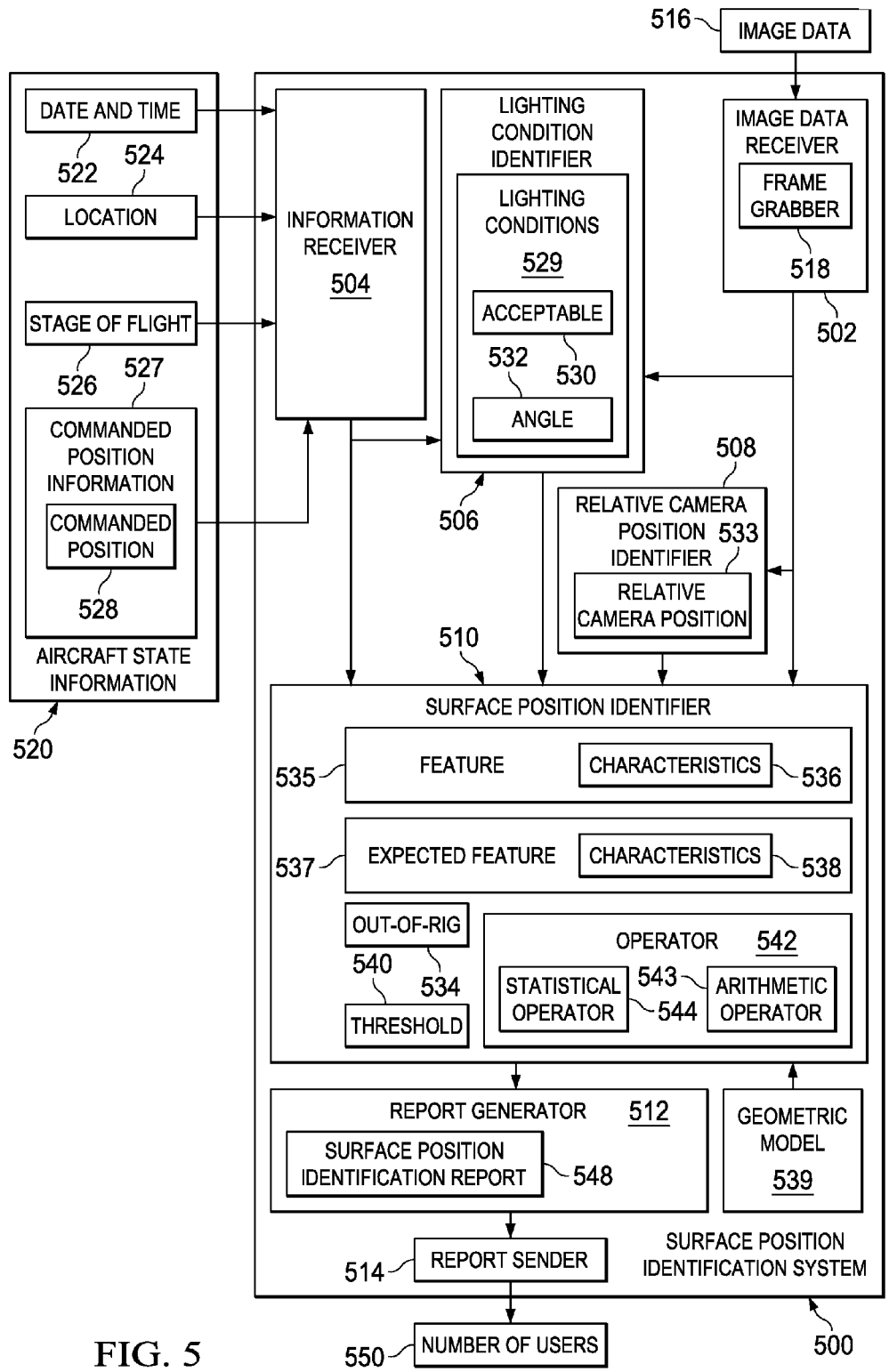
FIG. 5 is an illustration of a block diagram of a surface position identification system in accordance with an illustrative embodiment.

Turning now to FIG. 5, an illustration of a block diagram of a surface position identification system is depicted in accordance with an illustrative embodiment. In this example, surface position identification system 500 is an example of one implementation of surface position identification system 124 in FIG. 1. Surface position identification system 500 may include image data receiver 502, information receiver 504, lighting condition identifier 506, relative camera position identifier 508, surface position identifier 510, report generator 512, and report sender 514.

Image data receiver 502 may be configured to receive image data 516. Image data receiver 502 may be configured to receive image data 516 for images from a camera system on an aircraft. For example, without limitation, image data receiver 502 may include frame grabber 518 for obtaining image data 516 from the camera system. Image data 516 may comprise data defining images of surfaces on the aircraft.

Information receiver 504 may be configured to receive or obtain aircraft state information 520. For example, without limitation, aircraft state information 520 may include date and time 522, location 524, stage of flight 526, and commanded position information 527. Date and time 522 may be the current date and time. Location 524 may include information for identifying the current geographic location and orientation of the aircraft. Stage of flight 526 may include information for identifying the current stage of flight of the aircraft. For example, stage of flight 526 may indicate whether the aircraft is in cruise flight. Commanded position information 527 may include information for identifying commanded position 528 of a control surface or other moveable surface on the aircraft.

Information receiver 504 may be configured to receive aircraft state information 520 from various systems on the aircraft or from other appropriate sources of such information. For example, without limitation, aircraft state information 520 may be provided by or obtained from flight instruments on the aircraft, the aircraft navigation system, other appropriate sources, or various combinations of sources for such information.

Lighting condition identifier 506 may be configured to identify lighting conditions 529 at the surface on an aircraft for which image data 516 is obtained. Lighting condition identifier 506 may use image data 516, date and time 522 and location 524 of the aircraft, or any other appropriate information or combination of information to identify lighting conditions 529 at the surface on the aircraft for which image data 516 is obtained. For example, without limitation, lighting condition identifier 506 may be configured to determine whether lighting conditions 529 at the surface on the aircraft are acceptable 530, angle 532 of lighting at the surface, or both.

The positions of cameras on an aircraft with respect to surfaces on the aircraft may change while the aircraft is in flight. To correctly identify features of a surface in an image and determine the location of the surface using the image, an estimate of the position and orientation of the camera used to obtain the image with respect to the surface at the time the image was taken by the camera may be determined. Relative camera position identifier 508 may be configured to identify relative camera position 533 of the number of cameras providing image data 516. Relative camera position 533 may indicate the positions of the number of cameras providing image data 516 with respect to the surface on the aircraft for which image data 516 is obtained at the time image data 516 is obtained. For example, without limitation, relative camera position identifier 508 may process image data 516 to identify relative camera position 533.

Surface position identifier 510 may be configured to process image data 516 to identify the position of a surface on an aircraft. Any appropriate method may be used by surface position identifier 510 to process image data 516 to identify the position of the surface. For example, surface position identifier 510 may be configured to use aircraft state information 520 from information receiver 504, information identifying lighting conditions 529 from lighting condition identifier 506, relative camera position 533 from relative camera position identifier 508, or other information or combinations of information to process image data 516 to identify the position of the surface on the aircraft.

Surface position identifier 510 may be configured to process image data 516 to determine whether the surface on the aircraft is out-of-rig 534. Any appropriate method may be used by surface position identifier 510 to process image data 516 to determine whether the surface on the aircraft is out-of-rig 534.

For example, surface position identifier 510 may be configured to process image data 516 to identify feature 535 in the image defined by image data 516 that corresponds to the position of the surface on the aircraft. For example, without limitation, feature 535 may be a shadow cast by the surface in the image or any other feature that corresponds to the position of the surface on the aircraft. Feature 535 may have various characteristics 536. For example, without limitation, characteristics 536 may include the location, size and shape of the shadow cast by the surface in the image. Surface position identifier 510 may be configured to process image data 516 to identify characteristics 536 of feature 535 corresponding to the position of the surface on the aircraft.

Surface position identifier 510 may be configured to determine expected feature 537 and characteristics 538 of expected feature 537 corresponding to the desired position of the surface on the aircraft. Characteristics 538 of expected feature 537 may include various characteristics that a feature in the image defined by image data 516 corresponding to the position of a surface on the aircraft would be expected to have if the surface on the aircraft is in the desired position and, thus, not out-of-rig 534. For example, without limitation, characteristics 538 of expected feature 537 may include the expected location, size, and shape of a shadow cast by the surface in the image defined by image data 516 if the surface is in the desired position.

For example, surface position identifier 510 may use geometric model 539 of the surface of the aircraft to determine characteristics 538 of expected feature 537 corresponding to the desired position of the surface on the aircraft. Surface position identifier 510 may adjust geometric model 539 to account for relative camera position 533 with respect to the surface and commanded position 528 of the surface at the time image data 516 being processed is obtained by the camera system on the aircraft. Surface position identifier 510 may then determine the size, visual contrast, or other characteristics 538 of expected feature 537 using a visual reflectance map appended to geometric model 539 and angle 532 of lighting at the surface at the time image data 516 being processed is obtained by the camera system on the aircraft.

Surface position identifier 510 may be configured to compare characteristics 536 of feature 535 in the image defined by image data 516 corresponding to the position of the surface on the aircraft to the determined characteristics 538 of expected feature 537 in the image corresponding to a desired position of the surface to determine whether the surface is out-of-rig 534. For example, without limitation, the surface on the aircraft may be determined to be out-of-rig 534 if the difference between characteristics 536 of feature 535 in the image and characteristics 538 of expected feature 537 are greater than threshold 540. For example, threshold 540 may be specified by a user of surface position identification system 500.

For example, without limitation, the comparison between characteristics 536 of feature 535 in the image defined by image data 516 and characteristics 538 of expected feature 537 to determine whether a surface is out-of-rig 534 may be determined using operator 542. Operator 542 may be generated by surface position identifier 510 to identify characteristics 538 of expected feature 537 in the image defined by image data 516 using geometric model 539 of the surface of the aircraft as well as commanded position 528 for the surface, relative camera position 533, and angle 532 of lighting at the surface at the time image data 516 defining the image is obtained. For example, operator 542 may be arithmetic operator 543 or statistical operator 544.

Arithmetic operator 543 may include values for selected picture elements of the image in image data 516 which, when added to the actual values of the corresponding picture elements in image data 516, will equal zero if characteristics 538 of expected feature 537 in the image corresponding to a desired position of the surface are substantially the same as characteristics 536 of feature 535 in the image corresponding to the position of the surface on the aircraft. The surface may be determined to be out-of-rig 534 when the sum of the values for the selected picture elements in arithmetic operator 543 and the actual values of the corresponding picture elements in image data 516 is greater than threshold 540.

Picture element values in images may include noise. Arithmetic operator 543 may not provide guidance on whether a large difference between characteristics 536 of feature 535 in an image and characteristics 538 of expected feature 537 is due to feature 535 corresponding to a position of a surface that is not a desired position or to statistical fluctuation caused by noise. Statistical operator 544 may be used to counter this limitation. For example, statistical operator 544 may be used to compare the mean values of various groups of picture elements. Rather than return a numerical difference, statistical operator 544 may return a probability value for concluding that the mean value of one group of picture elements differs from the mean value of another group of picture elements. Statistical operator 544 thus may account for noise. Statistical operator 544 may allow detection of features wherein the mean difference from background picture elements is less than the noise, as long as there is enough data.

Report generator 512 may be configured to generate surface position identification report 548. Surface position identification report 548 may include information identifying the position of a surface on an aircraft as identified by surface position identifier 510. For example, surface position identification report 548 may identify a surface on the aircraft that is determined to be out-of-rig 534 by surface position identifier 510. Surface position identification report 548 also may include information identifying characteristics of a surface that is determined to be out-of-rig 534. For example, surface position identification report 548 may include information identifying an effect on operation of the aircraft of a surface being out-of-rig 534. The format and content of surface position identification report 548 may depend on number of users 550 to which surface position identification report 548 may be sent and on how the information in surface position identification report 548 may be used by number of users 550.

Report sender 514 may be configured to send surface position identification report 548 to number of users 550. The implementation of report sender 514 for any particular application may depend on specific characteristics of number of users 550, such as how surface position identification report 548 may be delivered to number of users 550 for use by number of users 550.

Figure 6:
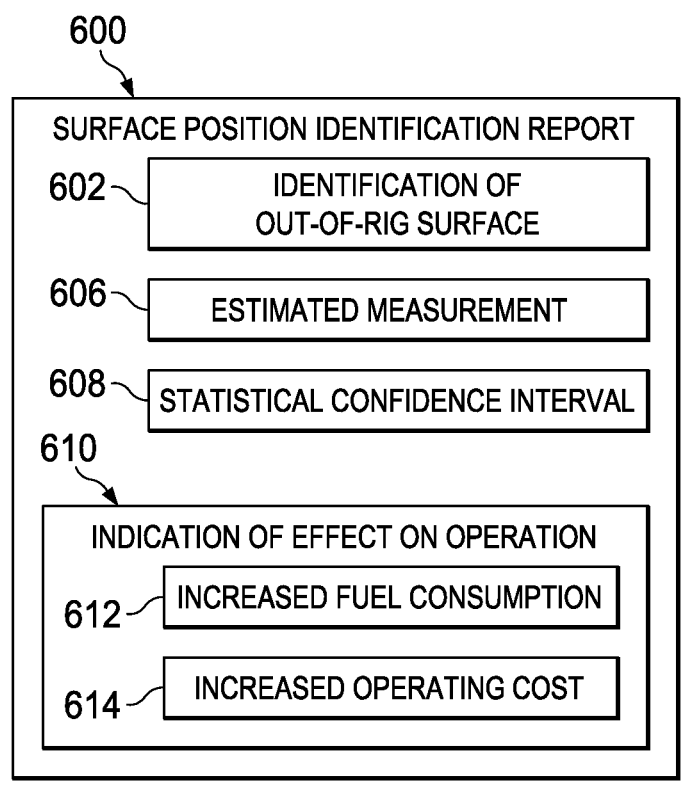
FIG. 6 is an illustration of a block diagram of a surface position identification report in accordance with an illustrative embodiment.

Turning now to FIG. 6, an illustration of a block diagram of a surface position identification report is depicted in accordance with an illustrative embodiment. In this example, surface position identification report 600 may be an example of one implementation of surface position identification report 137 in FIG. 1.

Surface position identification report 600 may provide identification of out-of-rig surface 602. For example, without limitation, identification of out-of-rig surface 602 may identify a part on the aircraft associated with the out-of-rig surface, a location on the aircraft of the out-of-rig surface, or any other information or various combinations of information for identifying the out-of-rig surface so that maintenance personnel or others may find the out-of-rig surface to rework the out-of-rig surface or take other appropriate action. Surface position identification report 600 also may include estimated measurement 606 of an amount by which the surface is out-of-rig. Surface position identification report 600 also may include statistical confidence interval 608 for estimated measurement 606.

Surface position identification report 600 also may include indication of effect on operation 610. Indication of effect on operation 610 may include information for identifying the effect that an identified out-of-rig surface may have on aircraft operation. For example, without limitation, indication of effect on operation 610 may include information identifying increased fuel consumption 612 that may result from the out-of-rig surface, increased operating cost 614 that may result from the out-of-rig surface, or other information or various combinations of information for indicating the degree to which an identified out-of-rig surface may affect aircraft operation. An operator of the aircraft or other entity may use indication of effect on operation 610 to determine whether rework of the out-of-rig surface is desirable, to prioritize or schedule rework of the out-of-rig surface, or for any other desired purpose.

The illustrations of FIGS. 1-6 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 7:
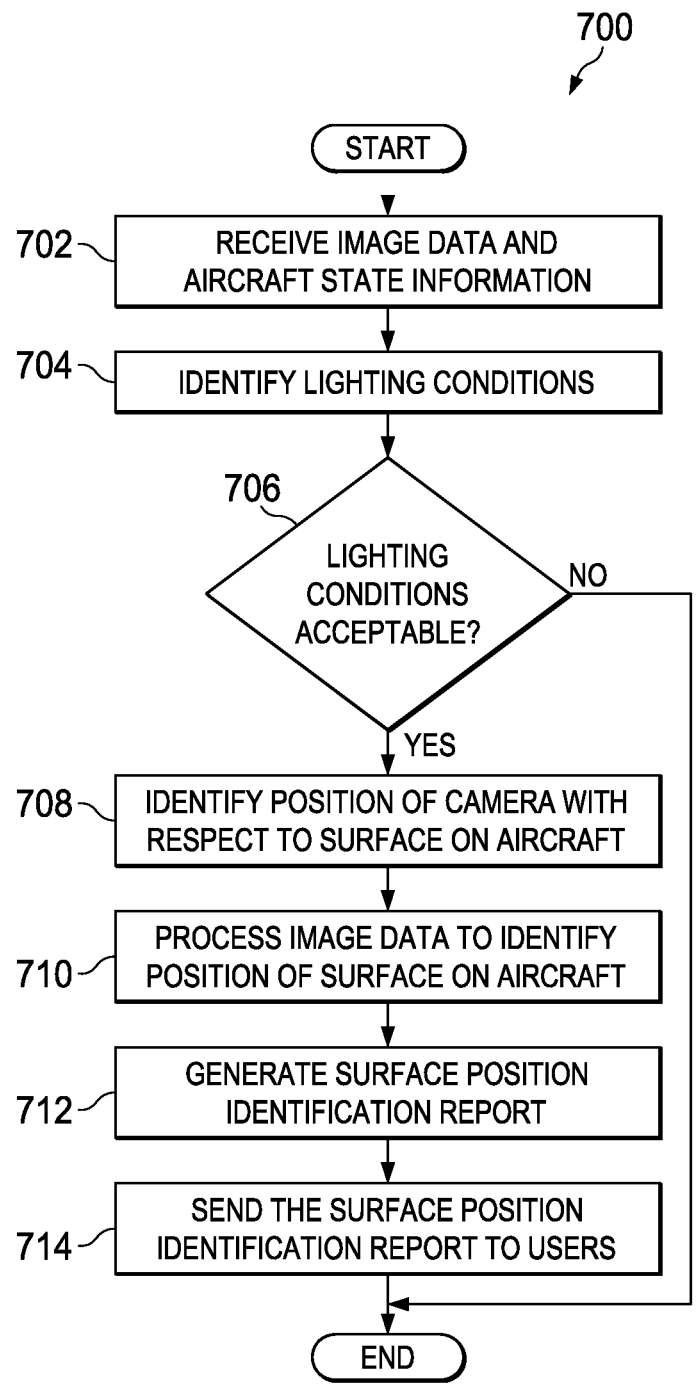
FIG. 7 is an illustration of a flowchart of a process for identifying a position of a surface on an aircraft in accordance with an illustrative embodiment.

Turning now to FIG. 7, an illustration of a flowchart of a process for identifying a position of a surface on an aircraft is depicted in accordance with an illustrative embodiment. For example, process 700 may be implemented in surface position identification system 124 in FIG. 1.

Process 700 may begin with receiving image data and aircraft state information (operation 702). The image data may include image data for images of a surface on an aircraft obtained by a camera system on the aircraft. For example, without limitation, the aircraft state information may include information for identifying the date and time at which the image data is obtained, the location and orientation of the aircraft at the time the image data is obtained, a commanded position for the surface on the aircraft, or other information or combinations of information for identifying the current state or condition of the aircraft.

Lighting conditions at the surface on the aircraft then may be identified (operation 704). For example, lighting conditions at the surface on the aircraft may be identified from the image data or the aircraft state information received in operation 702. Operation 704 may include identifying an angle of the lighting at the surface on the aircraft. It then may be determined whether the lighting conditions are acceptable (operation 706). The lighting conditions may be determined to be acceptable if it is determined that the lighting conditions are sufficient for obtaining images of the surface on the aircraft from which the position of the surface on the aircraft may be determined. If it is determined that the lighting conditions are not acceptable, the process terminates.

If it is determined that the lighting conditions are acceptable, the position of the camera used to obtain the image data with respect to the surface on the aircraft may be identified (operation 708). The position of the cameras on the aircraft with respect to the surface on the aircraft may change while the aircraft is in flight. To correctly identify features of a surface in an image and determine the location of the surface using the image, an estimate of the position and orientation of the camera used to obtain the image with respect to the surface at the time the image was taken by the camera may be determined.

The image data then may be processed to identify the position of the surface on the aircraft (operation 710). For example, operation 710 may include processing the image data to identify characteristics of a feature in the image corresponding to the position of the surface on the aircraft. Characteristics of an expected feature in the image corresponding to a desired position of the surface may be determined. For example, the characteristics of the expected feature in the image may be determined using a geometric model of the surface of the aircraft and the relative position of the camera with respect to the surface, the commanded position of the surface, and the angle of lighting at the surface at the time that the image was taken by the camera. The characteristics of the expected feature then may be compared to the characteristics of the feature in the image corresponding to the actual position of the surface on the aircraft to determine whether the surface is in the desired position. For example, the surface may be determined to be out-of-rig if the difference between the characteristics of the expected feature corresponding to the desired position of the surface and the characteristics of the feature in the image corresponding to the position of the surface on the aircraft is greater than a threshold.

The comparison between the characteristics of the expected feature and the characteristics of the feature in the image corresponding to the actual position of the surface may be made using an operator. For example, the operator may be generated for the characteristics of the expected feature corresponding to the desired position of the surface using a geometric model of the surface of the aircraft and the relative position of the camera with respect to the surface, the commanded position of the surface, and the angle of lighting at the surface at the time that the image was taken by the camera. This operator may be an arithmetic operator or a statistical operator. The operator then may be applied to the image data for the feature corresponding to the position of the surface in the image to determine whether the surface is in the desired position on the aircraft.

A surface position identification report then may be generated (operation 712). The surface position identification report may include information identifying the position of the surface on the aircraft. For example, the surface position identification report may include information identifying a surface on the aircraft that is determined to be out-of-rig. The surface position identification report also may include information for identifying the effect of the out-of-rig surface on operation of the aircraft.

The surface position identification report may then be sent to users (operation 714), with the process terminating thereafter. For example, without limitation, users of the surface position identification report may include an airline or other operator of the aircraft, maintenance personnel, or any other user that may make use of the information in the surface position identification report.

Turning now to FIG. 8, an illustration of a block diagram of a data processing system is depicted in accordance with an illustrative embodiment. In this example, data processing system 800 is an example of one implementation of a data processing system for implementing surface position identification system 124 in FIG. 1.

In this illustrative example, data processing system 800 includes communications fabric 802. Communications fabric 802 provides communications between processor unit 804, memory 806, persistent storage 808, communications unit 810, input/output (I/O) unit 812, and display 814. Memory 806, persistent storage 808, communications unit 810, input/output (I/O) unit 812, and display 814 are examples of resources accessible by processor unit 804 via communications fabric 802.

Processor unit 804 serves to run instructions for software that may be loaded into memory 806. Processor unit 804 may be a number of processors, a multi-processor core, or some other type of processor, depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and other suitable information either on a temporary basis or a permanent basis. Storage devices 816 also may be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output (I/O) unit 812 allows for input and output of data with other devices that may be connected to data processing system 800. For example, input/output (I/O) unit 812 may provide a connection for user input through a keyboard, a mouse, and/or some other suitable input device. Further, input/output (I/O) unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for execution by processor unit 804. The processes of the different embodiments may be performed by processor unit 804 using computer-implemented instructions, which may be located in a memory, such as memory 806.

These instructions are referred to as program instructions, program code, computer usable program code, or computer readable program code that may be read and executed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for execution by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800. In some instances, computer readable storage media 824 may not be removable from data processing system 800.

In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is a media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, or some other device capable of storing and transmitting program code 818.

The different components illustrated for data processing system 800 are not meant to provide architectural limitations to the manner in which different embodiments may be implemented. The different illustrative embodiments may be implemented in a data processing system including components in addition to and/or in place of those illustrated for data processing system 800. Other components shown in FIG. 8 can be varied from the illustrative examples shown. The different embodiments may be implemented using any hardware device or system capable of running program code. As one example, data processing system 800 may include organic components integrated with inorganic components and/or may be comprised entirely of organic components excluding a human being. For example, a storage device may be comprised of an organic semiconductor.

In another illustrative example, processor unit 804 may take the form of a hardware unit that has circuits that are manufactured or configured for a particular use. This type of hardware may perform operations without needing program code to be loaded into a memory from a storage device to be configured to perform the operations.

For example, when processor unit 804 takes the form of a hardware unit, processor unit 804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 818 may be omitted, because the processes for the different embodiments are implemented in a hardware unit.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system.

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in communications fabric 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a position of a surface on an aircraft, comprising:
   receiving image data for an image of the surface on the aircraft;
   processing the image data to identify a feature corresponding to the position of the surface on the aircraft to determine whether the position of the surface on the aircraft is a desired position, wherein the feature is at least one of a gap or a shadow;
   identifying an expected location, size, or shape of the feature; and
   generating a surface position identification report comprising information identifying whether the position of the surface on the aircraft is the desired position.

2. The method of claim 1, wherein the surface on the aircraft is selected from a moveable surface, a control surface, and a riggable surface.

3. The method of claim 1, wherein the image data is received from a camera on the aircraft.

4. The method of claim 3, wherein the image of the surface is obtained while the aircraft is in flight.

5. The method of claim 4 further comprising:
   identifying a relative camera position of the camera with respect to the surface; and
   wherein processing the image data uses the relative camera position to determine whether the position of the surface on the aircraft is the desired position.

6. The method of claim 1 further comprising:
identifying lighting conditions at the surface on the aircraft; and
determining whether the lighting conditions are acceptable; and
wherein processing the image data occurs in response to a determination that the lighting conditions are acceptable.

7. The method of claim 1 further comprising:
identifying an angle of lighting at the surface on the aircraft; and
wherein processing the image data uses the angle of lighting to determine whether the position of the surface on the aircraft is the desired position.

8. The method of claim 1 further comprising, responsive to a determination that the position of the surface on the aircraft is not the desired position:
identifying an effect on operation of the aircraft of the position of the surface not being the desired position; and
including an indication of the effect on operation of the aircraft in the surface position identification report.

9. An apparatus, comprising:
an image data receiver configured to receive image data for an image of a surface on an aircraft;
a surface position identifier configured to process the image data to identify a feature corresponding to the position of the surface on the aircraft to determine whether a position of the surface on the aircraft is a desired position, wherein the feature is at least one of a gap or a shadow, and wherein the surface position identifier is further configured to identify an expected location, size, or shape of the feature; and
a report generator configured to generate a surface position identification report comprising information identifying whether the position of the surface on the aircraft is the desired position.

10. The apparatus of claim 9, wherein the surface on the aircraft is selected from a moveable surface, a control surface, and a riggable surface.

11. The apparatus of claim 9, wherein the image data receiver is configured to receive the image data from a camera on the aircraft.

12. The apparatus of claim 11, wherein the image of the surface is obtained while the aircraft is in flight.

13. The apparatus of claim 12 further comprising:
a relative camera position identifier configured to identify a relative camera position of the camera with respect to the surface; and
wherein the surface position identifier is configured to process the image data using the relative camera position to determine whether the position of the surface on the aircraft is the desired position.

14. The apparatus of claim 9 further comprising:
a lighting condition identifier configured to identify lighting conditions at the surface on the aircraft and to determine whether the lighting conditions are acceptable; and
wherein the surface position identifier is configured to process the image data in response to a determination that the lighting conditions are acceptable.

15. The apparatus of claim 9 further comprising:
a lighting condition identifier configured to identify an angle of lighting at the surface on the aircraft; and
wherein the surface position identifier is configured to process the image data using the angle of lighting to determine whether the position of the surface on the aircraft is the desired position.

16. The apparatus of claim 9, wherein the report generator is configured to:
identify an effect on operation of the aircraft of the position of the surface not being the desired position; and
include an indication of the effect on operation of the aircraft in the surface position identification report.

17. A method for identifying a position of a surface on an aircraft, comprising:
receiving image data for an image of the surface on the aircraft;
identifying an angle of lighting at the surface on the aircraft;
processing the image data to identify characteristics of a feature in the image corresponding to the position of the surface on the aircraft, wherein the feature is at least one of a gap or shadow;
determining characteristics of an expected feature in the image corresponding to a desired position of the surface using the angle of lighting at the surface of the aircraft, wherein the characteristics include at least one of an expected location, size, or shape of the feature; and
comparing the characteristics of the feature in the image to the characteristics of the expected feature to determine whether the position of the surface on the aircraft is the desired position.

18. The method of claim 17, wherein the surface on the aircraft is selected from a moveable surface, a control surface, and a riggable surface.

19. The method of claim 17 further comprising:
generating an operator corresponding to the characteristics of the expected feature in the image, wherein the operator is selected from an arithmetic operator and a statistical operator; and
using the operator to compare the characteristics of the feature in the image to the characteristics of the expected feature to determine whether the position of the surface on the aircraft is the desired position.

* * * * *